United States Patent
Dandekar et al.

(10) Patent No.: US 10,827,039 B1
(45) Date of Patent: Nov. 3, 2020

(54) SYSTEMS AND METHODS FOR DYNAMIC COMPRESSION OF TIME-SERIES DATA

(71) Applicant: Dell Software Inc., Aliso Viejo, CA (US)

(72) Inventors: Shree A. Dandekar, Cedar Park, TX (US); Mark William Davis, Tracy, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 448 days.

(21) Appl. No.: 14/886,884

(22) Filed: Oct. 19, 2015

(51) Int. Cl.
  *H04L 29/06* (2006.01)
  *H04L 29/08* (2006.01)

(52) U.S. Cl.
  CPC .............. *H04L 69/04* (2013.01); *H04L 67/12* (2013.01)

(58) Field of Classification Search
  CPC ...................................................... H04L 69/04
  See application file for complete search history.

(56) References Cited

U.S. PATENT DOCUMENTS

| | | | |
|---|---|---|---|
| 8,553,768 B2 | 10/2013 | Song | |
| 8,572,342 B2 | 10/2013 | Arai et al. | |
| 8,638,243 B2 | 1/2014 | Kato et al. | |
| 8,665,943 B2 | 3/2014 | Fukuhara et al. | |
| 8,811,977 B2 | 8/2014 | Austin et al. | |
| 2002/0101367 A1* | 8/2002 | Geiger | H03M 7/30 341/51 |
| 2013/0317659 A1* | 11/2013 | Thomas | H04W 52/0216 700/286 |
| 2013/0325690 A1* | 12/2013 | Auerbach | G06Q 40/04 705/37 |
| 2014/0146188 A1* | 5/2014 | Ju | G06F 1/3278 348/207.1 |
| 2014/0223010 A1* | 8/2014 | Hayner | H04L 47/783 709/226 |

OTHER PUBLICATIONS

Deri, Luca, et al.; "tsdb: A Compressed Database for Time Series"; Proceedings of the 4th International Conference on Traffic Monitoring and Analysis; TMA 2012, LNCS 7189; Mar. 12, 2012; pp. 143-156.

(Continued)

*Primary Examiner* — Nicholas P Celani
(74) *Attorney, Agent, or Firm* — Shackelford, Bowen, McKinley & Norton, LLP

(57) ABSTRACT

In an embodiment, a method includes receiving, from a data source, time-series data of a time-series data stream produced by the data source. The method further includes identifying a target compression algorithm for the time-series data, wherein the target compression algorithm is linked to the data source in memory pursuant to a dynamically-variable assignment. The method also includes compressing the time-series data using the target compression algorithm and transmitting the compressed time-series data to a destination. Furthermore the method includes periodically optimizing the dynamically-variable assignment in real-time as the time-series data is received.

20 Claims, 6 Drawing Sheets

(56) References Cited

OTHER PUBLICATIONS

Goldstein, Rhys, et al.; "Real-Time Compression of Time Series Building Performance Data"; Proceedings of Building Simulation 2011, 12th Conference of International Building Performance Simulation Association; Nov. 14-16, 2011; pp. 1057-1064.
Esling, Philippe, et al.; "Time-Series Data Mining"; ACM Computing Surveys, vol. 45, No. 1, Article 12; Nov. 2012; 34 pages.
Fink, Eugene, et al.; "Compression of Time Series by Extracting Major Extrema"; Carnegie Mellon University, Research Showcase@CMU(http://repository.cmu.edu); Jul. 2010; 22 pages.
Singhal, Ashish, et al.; "Data Compression Issues with Pattern Matching in Historical Data"; American Control Conference, Denver, CO; Jun. 4-6, 2003; 6 pages.
Baydogan, Mustafa; "Ensemble Learning Strategies for Large-Scale Time Series Data Mining"; Hacettepe Üniversitesi, Endüstri Mühendisligi Bölümü, Seminer Duyurusu; Mar. 31, 2014; 2 pages.
Autofei; "Time Series Processing using Hadoop"; https://autofei.wordpress.com/2011/04/19/time-series-processing-using-hadoop/; Apr. 19, 2011; 5 pages.
Jacquin, Bruno, et al.; "A Proof of Concept with Hadoop: Storage and Analytics of Electrical Time-Series"; EDF Changer l'Énergie Ensemble; Jun. 13, 2012; 37 pages.
Bach, Felix, et al.; "Power Grid Time Series Data Analysis with Pig on a Hadoop Cluster compared to Multi Core Systems"; PDP 2013, 21st Euromicro International Conference on Parallel, Distributed, and Network-Based Processing; Feb. 2013; 6 pages.

\* cited by examiner

SYSTEMS AND METHODS FOR DYNAMIC COMPRESSION OF TIME-SERIES DATA

BACKGROUND

Technical Field

The present disclosure relates generally to data storage and more particularly, but not by way of limitation, to systems and methods for compression of time-series data.

History of Related Art

Machine-generated data is often a time series that includes a sequence of data items and associated timestamps. Such machine-generated data may be periodically referred to herein as time-series data. With the rapid growth of digital sources of information, time-series datasets are becoming massive. In an increasingly networked world like in the Internet of Things (IoT), more time-series data is being sent across networks more frequently. This often necessitates greater bandwidth, which may be unavailable or expensive. Network performance can also be negatively impacted.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In an embodiment, a method is performed by a computer system. The method includes receiving, from a data source, time-series data of a time-series data stream produced by the data source. The method further includes identifying a target compression algorithm for the time-series data, wherein the target compression algorithm is linked to the data source in memory pursuant to a dynamically-variable assignment. The method also includes compressing the time-series data using the target compression algorithm and transmitting the compressed time-series data to a destination. Furthermore the method includes periodically optimizing the dynamically-variable assignment in real-time as the time-series data is received, the periodically optimizing including: accessing a sample of the time-series data stream in relation to a sample period; determining information related to a time density of time-series data production by the data source over one or more intervals of the sample period; generating a time-series profile of the sample using at least a portion of the determined information; comparing attributes of the time-series profile to stored attributes of candidate compression algorithms; selecting a compression algorithm from among the plurality of compression algorithms based at least in part on a result of the comparing; and causing subsequent time-series data received from the data source to be compressed using the selected compression algorithm.

In one embodiment, an information handling system includes a processor. The processor is operable to implement a method. The method includes receiving, from a data source, time-series data of a time-series data stream produced by the data source. The method further includes identifying a target compression algorithm for the time-series data, wherein the target compression algorithm is linked to the data source in memory pursuant to a dynamically-variable assignment. The method also includes compressing the time-series data using the target compression algorithm and transmitting the compressed time-series data to a destination. Furthermore the method includes periodically optimizing the dynamically-variable assignment in real-time as the time-series data is received, the periodically optimizing including: accessing a sample of the time-series data stream in relation to a sample period; determining information related to a time density of time-series data production by the data source over one or more intervals of the sample period; generating a time-series profile of the sample using at least a portion of the determined information; comparing attributes of the time-series profile to stored attributes of candidate compression algorithms; selecting a compression algorithm from among the plurality of compression algorithms based at least in part on a result of the comparing; and causing subsequent time-series data received from the data source to be compressed using the selected compression algorithm.

In one embodiment, a computer-program product includes a non-transitory computer-usable medium having computer-readable program code embodied therein. The computer-readable program code is adapted to be executed to implement a method. The method includes receiving, from a data source, time-series data of a time-series data stream produced by the data source. The method further includes identifying a target compression algorithm for the time-series data, wherein the target compression algorithm is linked to the data source in memory pursuant to a dynamically-variable assignment. The method also includes compressing the time-series data using the target compression algorithm and transmitting the compressed time-series data to a destination. Furthermore the method includes periodically optimizing the dynamically-variable assignment in real-time as the time-series data is received, the periodically optimizing including: accessing a sample of the time-series data stream in relation to a sample period; determining information related to a time density of time-series data production by the data source over one or more intervals of the sample period; generating a time-series profile of the sample using at least a portion of the determined information; comparing attributes of the time-series profile to stored attributes of candidate compression algorithms; selecting a compression algorithm from among the plurality of compression algorithms based at least in part on a result of the comparing; and causing subsequent time-series data received from the data source to be compressed using the selected compression algorithm.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
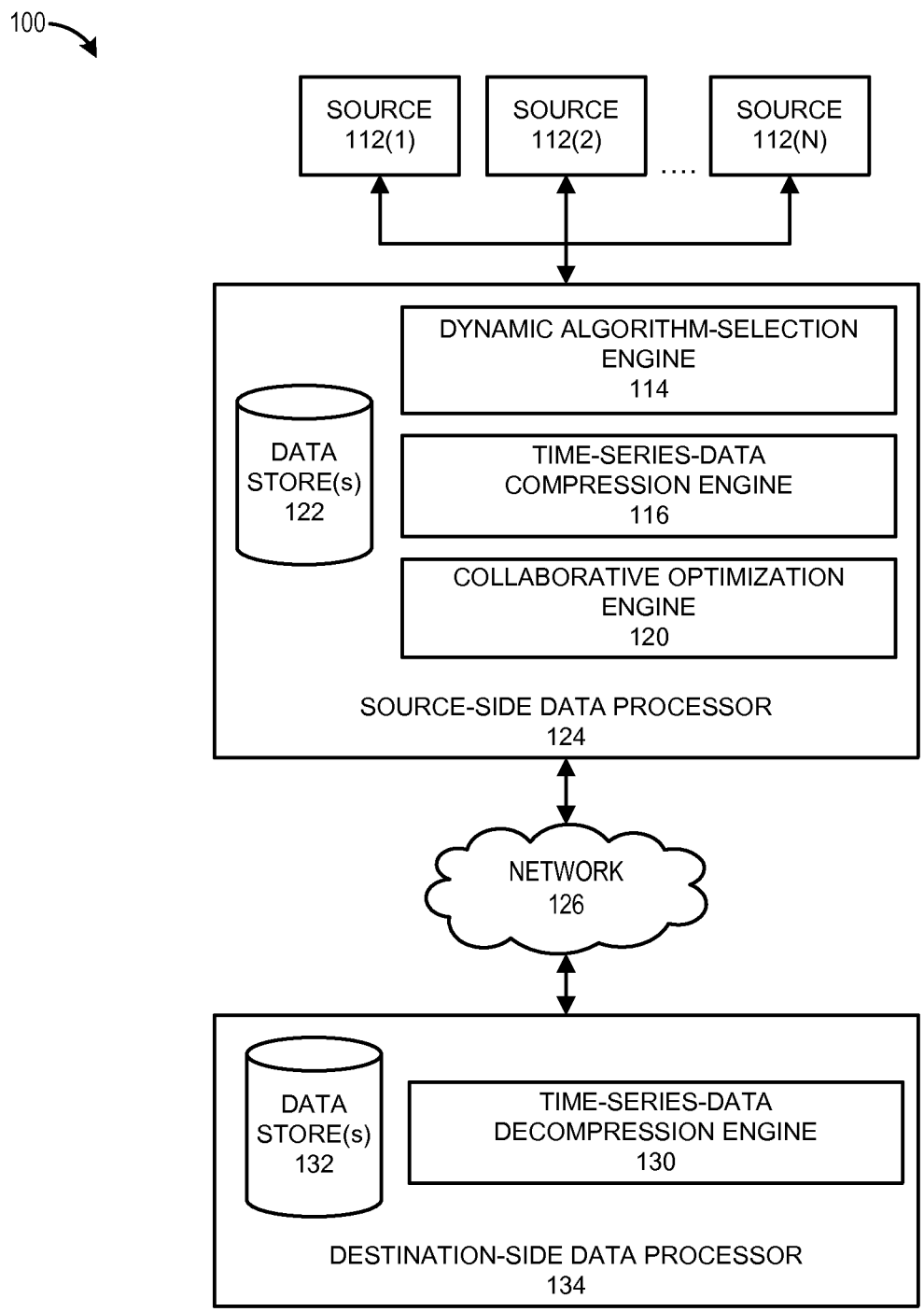
FIG. 1 illustrates an example of a system that is operable to perform real-time, dynamic compression of time-series data.

In various embodiments, the transmission of time-series data from a source to a destination can create a significant burden on networks and network-related resources. One way to address this problem is to reduce the frequency with which time-series data is collected and stored. However, this approach might fail to satisfy the reporting and querying demands of users. For example, users often demand that Internet of Things (IoT) solutions support interactive drill-down into time-series data immediately as thousands of data items are collected in real-time from various network sensors.

Another way to approach this problem might be to use an available compression algorithm to compress time-series data before transmitting it over a network. This approach can also have various disadvantages. Lossless compression algorithms, for example, cannot generally guarantee compression for all input data sets. In other words, for any lossless compression algorithm, there will typically be an input dataset that does not get smaller when processed by the algorithm, and for any lossless compression algorithm that makes at least one file smaller, there will typically be at least one file that it makes larger.

The present disclosure describes examples of dynamically selecting time-series compression algorithms for a wide range of time-series data. In certain embodiments, time-series data streams emanating from a data source can be periodically sampled and profiled to dynamically select a best-fit compression algorithm for new or subsequent time-series data. Additionally, the data source, or compressor, can synchronize with a data destination, or decompressor, to ensure that both source and destination are utilizing the same compression algorithm. Advantageously, in certain embodiments, worst-case performance of compression algorithms can be avoided by not applying inappropriate compression to time-series datasets.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example of a system 100 that is operable to perform real-time, dynamic compression of time-series data. The system 100 includes data sources 112(1), 112(2) and 112(N) (collectively, data sources 112), a source-side data processor 124, a network 126 and a destination-side data processor 134. The network 126 can include any type of wired, wireless, or cellular network that enables one or more computing systems to communicate with the source-side data processor 124, the destination-side data processor 134, another computer system, and/or a component of the foregoing. In some cases, the network 126 can include the Internet. In general, time-series data in the system 100 flows from the data sources 112, through the source-side data processor 124 and the network 126, to the destination-side data processor 134.

In certain embodiments, the data sources 112 can be sensors in an IoT system. In an example, the data sources 112 can be home-automation sensors that provide time-series data related to temperature, humidity, security data, live media feeds (e.g., audio and/or video), operational data of an appliance, heartbeat data for any of the foregoing, combinations of same and/or the like. In a typical embodiment, the data sources 112 are each communicably coupled to the source-side data processor 124 via a wired or wireless connection.

In the illustrated embodiment, the source-side data processor 124 includes a dynamic algorithm-selection engine 114, a time-series-data compression engine 116, a collaborative optimization engine 120, and one or more data stores 122. In general, the time-series-data compression engine 116 is operable to receive time-series data provided by each data source of the data sources 112 and compress the time-series data using a compression algorithm assigned to the data source. The compressed time-series data can be transmitted by the time-series-data compression engine 116 to the destination-side data processor 134. Example operation of the source-side data processor 124 will be described in greater detail with respect to FIG. 4.

In certain embodiments, the compression algorithms assigned to the data sources 112 can be dynamically changed. In particular, the dynamic algorithm-selection engine 114 can be periodically triggered to dynamically select a best-fit compression algorithm for the data sources 112, on a per data source basis, based on a sampling and profiling of time-series data produced by the data source. The selected best-fit compression algorithm for a given data source of the data sources 112 can be assigned thereto. The compression algorithm that is assigned to each of the data sources 112 at a given time can be maintained in the one or more data stores 122. Example operation of the dynamic algorithm-selection engine 114 will be described in relation to FIG. 5.

In various embodiments, the collaborative optimization engine 120 can communicate with other computer systems to share (and acquire) performance results of using particular compression algorithms on data sources with particular time-series profiles. For example, such other computer systems can be configured similarly to the source-side data processor 124 and/or the destination-side data processor 134. Additionally, in various embodiments, the collaborative optimization engine 120 can employ machine-learning techniques to train the dynamic algorithm-selection engine 114 using performance results generated by the source-side data processor 124 and/or other computer systems. Example operation of the collaborative optimization engine 120 will be described in greater detail with respect to FIG. 6.

The destination-side data processor 134 includes a time-series-data decompression engine 130 and one or more data stores 132. Example data that can be stored in the one or more data stores 132 will be described in relation to FIG. 3. In general, the time-series-data decompression engine 130 is operable to receive and decompress compressed time-series data provided by the time-series-data compression engine 116. Example operation of the destination-side data processor 134 will be described in greater detail with respect to FIG. 4.

For simplicity of description and illustration, a particular arrangement of components is shown in FIG. 1. However, that arrangement can be varied to suit a particular implementation. For example, in some embodiments, the functionality of the dynamic algorithm-selection engine 114 can instead be allocated to the destination-side data processor 134, while in other embodiments, both the source-side data processor 124 and the destination-side data processor 134 can include an engine or module similar to the dynamic algorithm-selection engine 114. In similar fashion, while the source-side data processor 124 is shown to include the collaborative optimization engine 120, in various embodiments, the destination-side data processor 134 can include such an engine or module (instead of or in addition to such module on the source-side data processor 124).

Figure 2:
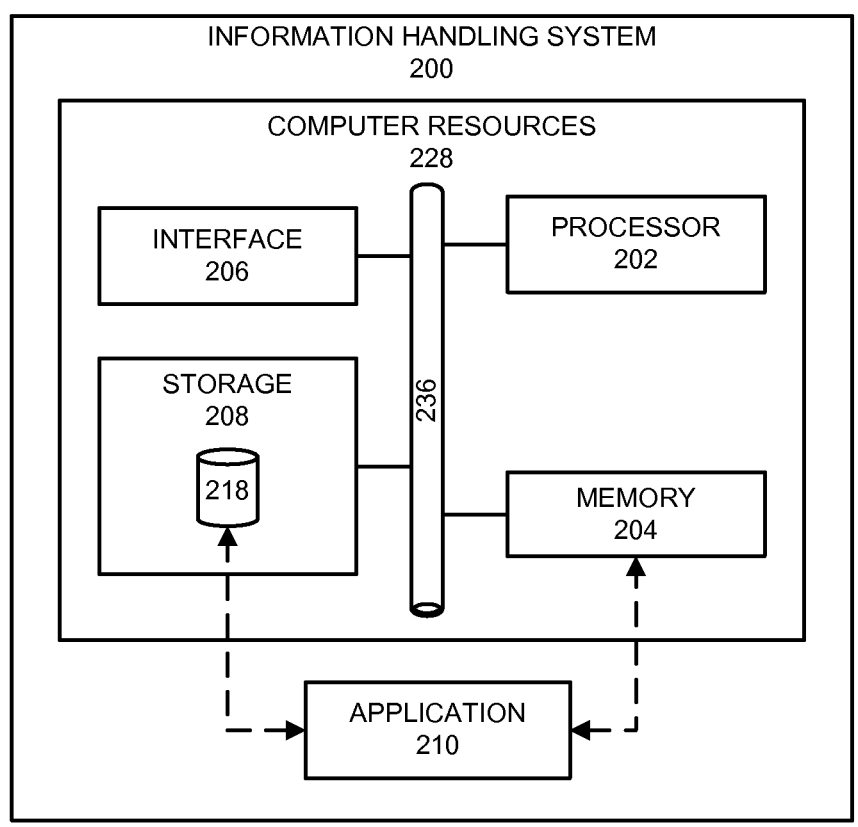
FIG. 2 illustrates an example of an information handling system.

FIG. 2 illustrates an example of an information handling system 200. In various embodiments, one or more information handling systems similar to the information handling system 200 can be included within, or implement, the source-side data processor 124, the dynamic algorithm-selection engine 114, the time-series-data compression engine 116, the collaborative optimization engine 120, the destination-side data processor 134, the time-series-data decompression engine 130, computer systems communicating with any of the foregoing and/or the like. The information handling system 200 includes an application 210 operable to execute on computer resources 228. In particular embodiments, one or more instances of the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks. For example, in certain embodiments, all or part of the destination-side data processor 134 can reside in a cloud.

In the depicted embodiment, the information handling system 200 includes a processor 202, memory 204, storage 208, interface 206, and bus 236. Although a particular information handling system is depicted having a particular number of particular components in a particular arrangement, this disclosure contemplates any suitable information handling system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the information handling system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the information handling system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the information handling system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like. The configurations can include, for example, any data described herein as being stored in a data store.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the interface 206 can utilize communication via various other types of wireless communication such as infrared (IR) communication, radio frequency (RF) communication, communication via direct electrical connections, etc. In general, the information handling system 200 may include any suitable interface 206 for any one or more of these networks, where appropriate.

In some embodiments, interface 206 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the information handling system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in Hyper Text Markup Language (HTML), Extensible Markup Language (XML), or other suitable markup language. In particular embodiments, encoded software is expressed in a higher-level scripting language, such as Perl or JavaScript.

Figure 3:
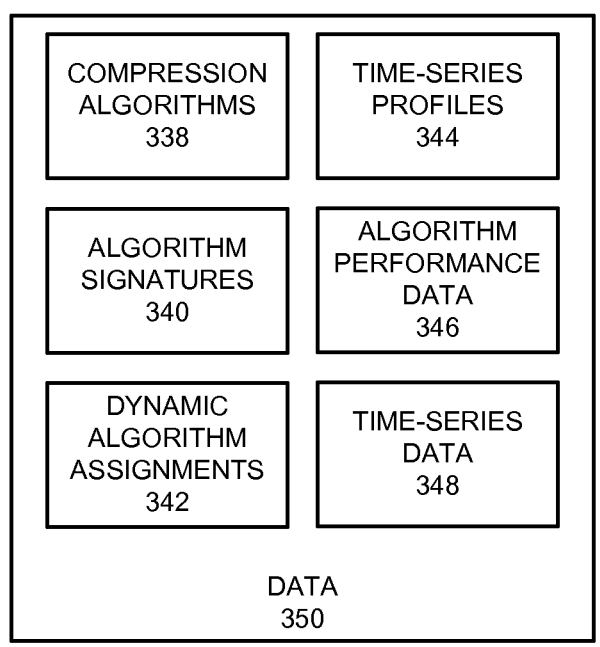
FIG. 3 illustrates example data that can be stored by a source-side data processor and/or a destination-side data processor.

FIG. 3 illustrates example data 350 that can be stored in the one or more data stores 122 of the source-side data processor 124 of FIG. 1 and/or the one or more data stores 132 of the destination-side data processor 134 of FIG. 1. The example data 350 includes compression algorithms 338, algorithm signatures 340, dynamic algorithm assignments 342, time-series profiles 344, algorithm performance data 346, and time-series data 348.

In certain embodiments, the compression algorithms 338 can include implementation logic, in the form of a software application, that carries out data compression. In other embodiments, the compression algorithms 338 can be indicative of identifiers for selectable compression algorithms that are supported, for example, by the system 100 of FIG. 1. In an example, the compression algorithms 338 can include, or identify, lossless digital data compression algorithms, algorithms based on continuous signal compression, combinations of same, and/or the like. Examples of lossless data compression algorithms that can be among the compression algorithms 338 include, but are not limited to, run-length encoding, Lempel-Ziv (LZ), Lempel-Ziv-Welch (LZW), Prediction by Partial Match (PPM), Burroughs-Wheeler transform (BWT), Dynamic Markov Compression (DMC), PAQ mixture modeling. Examples of algorithms based on continuous signal compression that can be among the compression algorithms 338 include, but are not limited to, discrete cosine transform (DCT), linear predictive coding (LPC), wavelet decomposition, and extrema encoding.

The algorithm signatures 340 can include attributes, or parameters, of each of the compression algorithms 338. In an example, the algorithm signatures 340 can include one or more of the parameters listed below in Table 1.

TABLE 1

| EXAMPLE PARAMETER | EXAMPLE DESCRIPTION |
| --- | --- |
| Algorithm Type | Indicates an algorithm classification such as, for example, lossless, continuous signal compression, etc. |
| Data Dictionary Size | The data dictionary size can indicate a size of the data dictionary used by a given compression algorithm. A data dictionary can be used in some algorithms to replace specified fragments of data with a reference that can be looked up in a data dictionary. |
| Compression block size | This parameter indicates a compression block size used by a given algorithm. In various embodiments, smaller compression block sizes optimize access speed while larger block sizes optimize compression. In some cases, this attribute can indicate a minimum compression block size and/or a maximum compression block size supported by a given algorithm. |
| Type of coder | Indicates a type of coder used by a given compression algorithm (e.g., dictionary-based coder, probability-based coder, etc.). |
| Maximum data dictionary context size | The maximum context size is the largest number of data items that can be represented in the data dictionary. In some cases, the context considered by the algorithm is variable. The maximum context parameter sets a ceiling on the context size. |
| Length of context skips | Context skips allow for compression of data items that have other padding information between them. For some dynamic algorithms, the length of that skip can be dynamically set. |
| Lossiness | Lossy compression algorithms support using fewer bytes to express approximate values. The maximum allowed lossiness is controlled by this parameter. |

TABLE 1-continued

| EXAMPLE PARAMETER | EXAMPLE DESCRIPTION |
|---|---|
| Mix of model contexts (for PAQ-style algorithms) | PAQ algorithms combine different types of algorithms, contexts and other parameters. The precise mix of these algorithms can be set using this parameter. |

The dynamic algorithm assignments 342 can indicate which of the compression algorithms 338 is assigned to each of the data sources 112. As will be described in greater detail with respect to FIG. 5, the dynamic algorithm assignments 342 can be modified in real-time as time-series data is received. The time-series profiles 344 can each include attributes of a sample of a time-series data stream provided by a data source such as, for example, one of the data sources 112 of FIG. 1. In an example, each of the time-series profiles 344 can include one or more of the parameters listed below in Table 2.

TABLE 2

| EXAMPLE PARAMETER | EXAMPLE DESCRIPTION |
|---|---|
| Amplitude | For time-varying data signals, compression often requires using the smallest number of bytes or bits to express the precise value of the signal. As maximum and minimum values of amplitude change, the number of bits required can be adjusted to accommodate the range of values in the signal. |
| Spectral decomposition (EFT) of data sequence | Analog signals can be decomposed into representative spectral components. The value of this decomposition for compression is that the spectral properties can be transmitted rather than the time-varying signal itself. This can dramatically enhance compression for signals of a given type. |
| Burst frequency | Signals that contain time-varying information that is emitted only periodically can be enhanced by learning the frequency of these packages or bursts. |
| Burst size | The size of the burst of information and other characteristics can also be used to reduce the number of bits needed to characterize the signal. |
| Auto-regression parameters | Auto-regression parameters can characterize the shape of an analog or digital signal based on summations of the signal amplitudes over finite time or other windows. These parameters are related to the covariance of the signals and can be transmitted by some algorithms instead of the encoded signal itself. |
| Amplitude mean | For certain time-varying signals, transmitting the amplitude mean or other descriptive statistics, as well as deviations around that mean, can reduce the quantity of information that must be transmitted. |

The algorithm performance data 346 can include results of a compression such as, for example, a compression ratio, time to compress, time to decompress, other metrics, combinations of same, and/or the like. Furthermore, in certain embodiments, some or all of the compression algorithms 338 can include a plurality of phases of operation such as, for example, run-length encoding, data dictionary lookup and update, and byte encoding (using, e.g., Huffman coding, arithmetic coding, Golomb/prefix coding, etc.). In these embodiments, the algorithm performance data 346 can include, for example, a time spent in each phase of a given compression algorithm. The time-series data 348 can include all time-series data that has been received (or a summary thereof) from sources such as the data sources 112.

Figure 4:
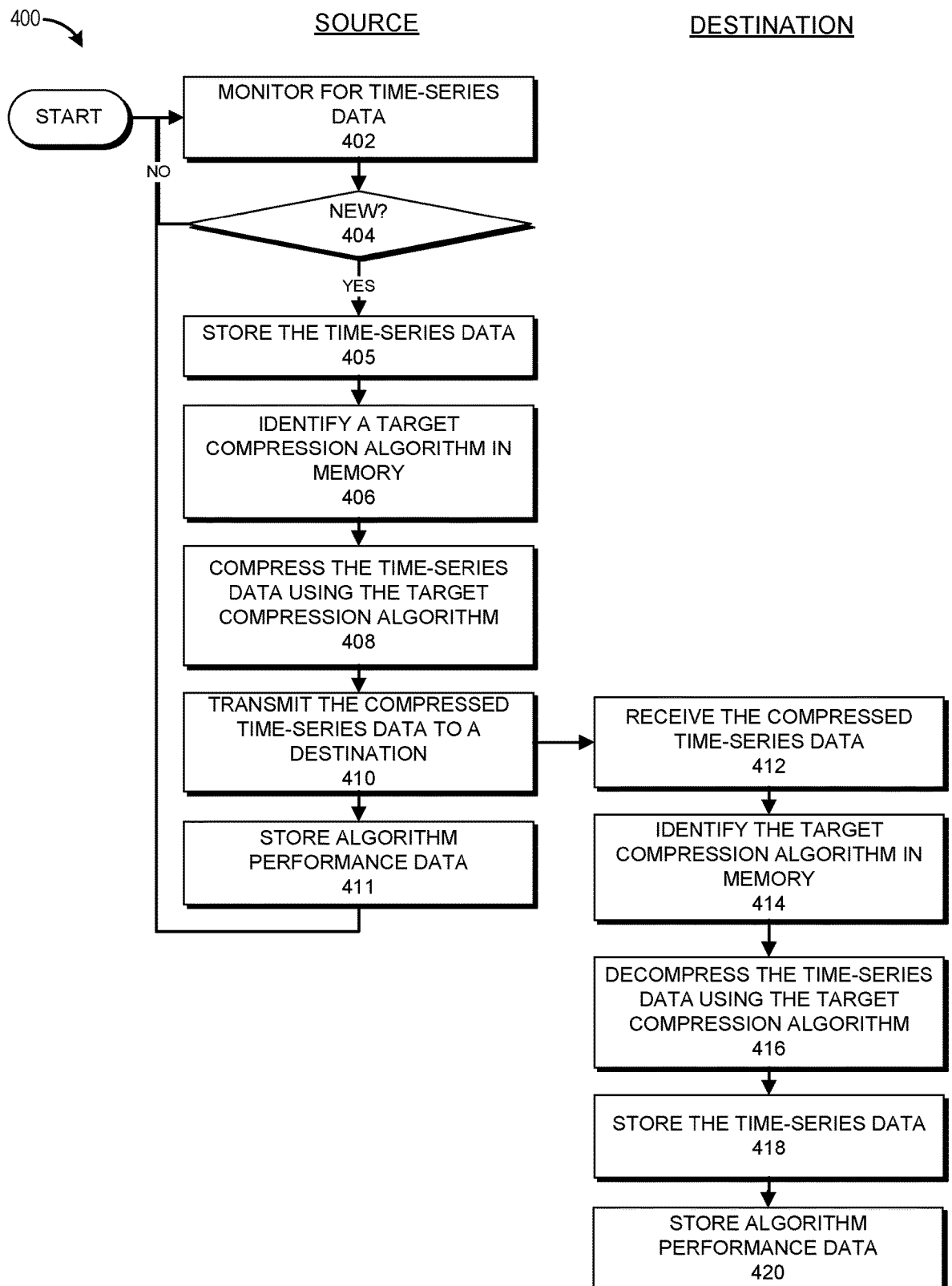
FIG. 4 illustrates a process for handling time-series data.

FIG. 4 presents a flowchart of an example of a process 400 for handling time-series data in parallel from multiple sources. The process 400 can be implemented by any system that can access one or more data sources. For example, the process 400, in whole or in part, can be implemented by the dynamic algorithm-selection engine 114, the time-series-data compression engine 116, the collaborative optimization engine 120 and/or the time-series-data decompression engine 130. The process 400 can also be performed generally by the source-side data processor 124, the destination-side data processor 134 and/or the system 100. Although any number of systems, in whole or in part, can implement the process 400, to simplify discussion, the process 400 will be described in relation to specific systems or subsystems of the system 100.

At block 402, the time-series-data compression engine 116 monitors for time-series data from the data sources 112. At decision block 404, the time-series-data compression engine 116 determines whether new or subsequent time-series data has been received. If not, the process 400 returns to block 402 and proceeds as described above. Otherwise, if it is determined at the decision block 404 that new or subsequent time-series data has been received from a particular data source of the data sources 112, the process 400 proceeds to block 405. At block 405, some or all of the time-series data can be stored in the one or more data stores 122, for example, as part of the time-series data 348 described in relation to FIG. 3.

At block 406, the time-series-data compression engine 116 identifies a target compression algorithm in memory for the time-series data. For example, the block 406 can include the time-series-data compression engine 116 looking up an identifier for the particular data source in the dynamic algorithm assignments 342 described with respect to FIG. 3 and retrieving an identifier of one of the compression algorithms 338 of FIG. 3. In that way, the target compression algorithm can be the compression algorithm (of the compression algorithms 338) to which the particular data source is mapped in the dynamic algorithm assignments 342.

At block 408, the time-series-data compression engine 116 compresses the time-series data using the target compression algorithm. At block 410, the time-series-data compression engine 116 transmits the compressed time-series data to a destination represented, for example, by the destination-side data processor 134. After block 410, the process 400 can, in parallel, proceed to both block 411 and block 412. At block 411, the time-series-data compression engine 116 can store algorithm performance data related to the compression, for example, as part of the algorithm performance data 346 in the one or more data stores 122 or other memory. As described above, the stored algorithm performance data can include information related to compression ratio, time to compress, and/or other data. After block 411, the process 400 returns to block 402 to monitor for more time-series data.

At block 412, the time-series-data decompression engine 130 receives the compressed time-series data. At block 414, the time-series-data decompression engine 130 identifies the target compression algorithm in memory. In certain embodiments, the time-series-data decompression engine 130 can perform a lookup similar to the lookup described with respect to the block 406. At block 416, the time-series-data decompression engine 130 decompresses the time-series data using the target compression algorithm. At block 418, the time-series-data decompression engine 130 stores the time-series data in the one or more data stores 132 or other memory. At block 420, the time-series-data decompression engine 130 can store algorithm performance data related to the decompression, for example, as part of the algorithm performance data 346 in the one or more data stores 132 or other memory. As described above, the stored algorithm performance data can include information related to compression ratio, time to compress, time to decompress and/or other data.

Figure 5:
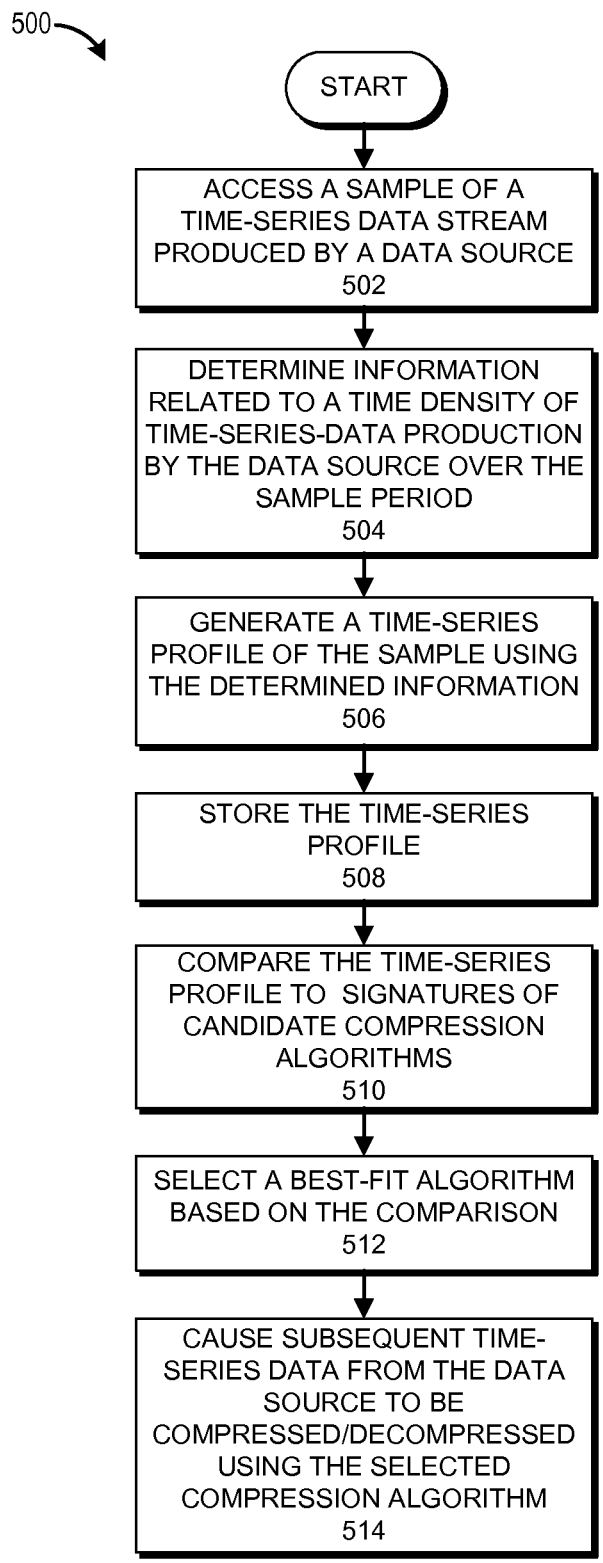
FIG. 5 illustrates a process for dynamically modifying a compression algorithm for time-series data produced by a data source.

FIG. 5 presents a flowchart of an example of a process 500 for dynamically modifying a compression algorithm for time-series data produced by a data source. In various embodiments, the process 500 can be triggered for each data source of the data sources 112 on a periodic basis (e.g., hourly, daily, etc.). In other embodiments, the process 500 can be triggered whenever a data source is added to the data sources 112 (e.g., a configurable time period after a data source comes online). The process 500 can also be triggered on-demand by a user or administrator and/or in any other suitable way.

The process 500 can be implemented by any system that can access one or more data sources. For example, the process 500, in whole or in part, can be implemented by the dynamic algorithm-selection engine 114, the time-series-data compression engine 116, the collaborative optimization engine 120 and/or the time-series-data decompression engine 130. The process 500 can also be performed generally by the source-side data processor 124, the destination-side data processor 134 and/or the system 100. Although any number of systems, in whole or in part, can implement the process 500, to simplify discussion, the process 500 will be described in relation to specific systems or subsystems of the system 100.

At block 502, the dynamic algorithm-selection engine 114 accesses a sample of a time-series data stream produced by a particular data source of the data sources 112. In various embodiments, the sample includes some or all time-series data produced by the particular data source over a sample period such as, for example, a preceding day, a preceding hour, a designated range of time, combinations of same, and/or the like. In some cases, the block 502 can include generating the sample. For example, the sample can be retrieved from, or generated from, time-series data such as the time-series data 348 described in relation to FIG. 3.

At block 504, the dynamic algorithm-selection engine 114 determines information related to a time density of time-series data production by the particular data source over one or more intervals of the sample period. In general, the time density of time-series data production refers to a frequency with which time-series data is produced for compression such that greater production (e.g., clustered production) within an interval constitutes greater time density and less production within the interval constitutes lesser time density. In an example, the block 504 can include creating a time map of when each time-series data item was produced over the sample period.

At block 506, the dynamic algorithm-selection engine 114 generates a time-series profile of the sample using the information determined at block 504. For example, the time-series profile can be similar to the time-series profiles 344 described in relation to FIG. 3. The time series profile of the sample can include a number of measureable and calculable attributes such as, for example, any of the attributes described above in relation to Table 2. At block 508, the time-series profile can be stored in the one or more data stores 122, for example, as part of the time-series profiles 344 described in relation to FIG. 3.

At block 510, the dynamic algorithm-selection engine 114 compares attributes of the time-series profile to attributes of the algorithm signatures 340. As described previously, each of the compression algorithms 338 can be a candidate compression algorithm for consideration by the dynamic algorithm-selection engine 114. Also as described previously, the algorithm signatures 340 can each include a number of attributes such as, for example, any of the attributes described above in relation to Table 1. In certain embodiments, the attributes of the time-series profile can be represented as an abstract data type such as a feature vector. In certain embodiments, the attributes of each of the algorithm signatures 340 can also be represented as an abstract data type such as a feature vector.

In an example utilizing feature vectors of the type described above, the block 510 can include the dynamic algorithm-selection engine 114 determining a similarity between the feature vector of the time-series profile and the feature vector of each of the algorithm signatures 340. According to this example, the similarity between a given algorithm-signature feature vector and the time-series profile feature vector can be calculated as an inner product that sums the product of each corresponding feature. For instance, given a signal with a burst periodicity of two-hundred milliseconds, a context skipping algorithm with a skip size of two-hundred milliseconds would score highly on a similarity basis due to the match of the periods for context and burst size.

At block 512, the dynamic algorithm-selection engine 114 selects a best-fit compression algorithm based on a result of the block 510. In an example, the block 510 can result in a ranked list of the compression algorithms 338 according to a determined similarity to the time-series profile of the sample. According to this example, the best-fit compression algorithm can be a highest-ranked algorithm in the ranked list.

At block 514, the dynamic algorithm-selection engine 114 causes subsequent time-series data form the particular data source to be compressed and decompressed using the selected best-fit compression algorithm. In certain embodiments, the block 514 can involve the dynamic algorithm-selection engine 114 synchronizing with the destination-side data processor 134, for example, by sending a signal identifying and/or containing the selected best-fit compression algorithm. In these embodiments, the dynamic algorithm assignments 342, which can represented in both the one or more data stores 122 and the one or more data stores 132, can be updated. Thereafter, as new or subsequent algorithm lookups are performed as described with respect to blocks 406 and 414 of FIG. 4, the selected best-fit compression algorithm can be identified as the target compression algorithm.

Figure 6:
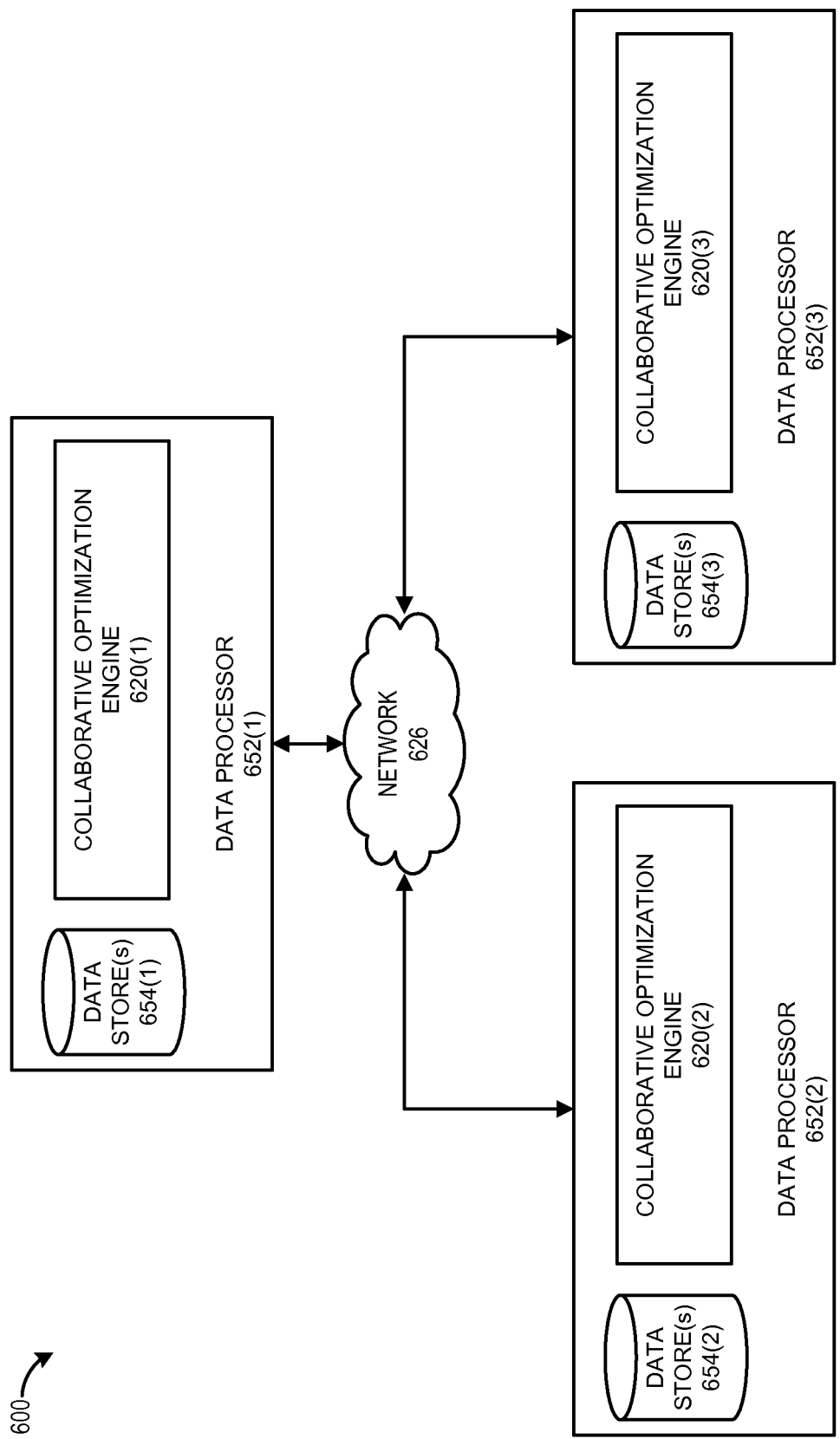
FIG. 6 illustrates an example of a system for collaborative optimization of compression algorithms for data sources.

FIG. 6 illustrates an example of a system 600 for collaborative optimization of compression algorithms for data sources. The system 600 includes a data processor 652(1), a data processor 652(2) and a data processor 652(3) (collectively, data processors 652). The system 600 further includes a network 626. The network 626 can include any type of wired, wireless, or cellular network that enables the data processors 652 to communicate. In some cases, the network 626 can include the Internet. For simplicity of illustration and description, the data processors 652 are shown to be three in number. It should be appreciated that, in various implementations, any number of data processors can be included among the data processors 652.

In general, the data processors 652 can include any combination of source-side data processors (e.g., the source-side data processor 124 of FIG. 1) and destination-side data processors (e.g., the destination-side data processor 134 of FIG. 1). It should be appreciated that each of the data processors 652 can also include additional components such as, for example, any of the components shown or described with respect to the source-side data processor 124 of FIG. 1 and/or the destination-side data processor 134 of FIG. 1. More particularly, the data processors 652(1), 652(2) and 652(3) are shown to include collaborative optimization engines 620(1), 620(2) and 620(3) (collectively, collaborative optimization engines 620), respectively, and one or more data stores 654(1), 654(2) and 654(3) (collectively, data stores 654), respectively.

As described previously, the collaborative optimization engines 620 can have access to performance data such as the algorithm performance data 346 of FIG. 3. In various embodiments, good performance can be objectively defined using performance data such as the algorithm performance data 346. In an example, good performance can be characterized by high compression ratio, low time to compress, low time to decompress, etc.

In an example, the data processor 652(1) can transmit a request for algorithm experience data to the data processors 652(2) and 652(3). In a typical embodiment, the request specifies a time-series profile. The request can be for experience data related to previous experience of the data processors 652(2) and 652(3), respectively, in compressing the same or a sufficiently similar time-series profile as the specified time-series profile. Two time-series profiles can be deemed sufficiently similar, for example, by having a threshold percentage of attributes or parameters that match or are within a predetermined range of each other, by having a particular subset of attributes that exactly match or are within a predetermined range of each other, and/or in other ways.

According to this example, the data processors 652(2) and 652(3) can each respond by identifying one or more compression algorithms and providing corresponding performance data. The data processor 652(1) can compare the received algorithm performance data to algorithm performance data for a target compression algorithm of a corresponding source (e.g., as evidenced by dynamic algorithm assignments such as the dynamic algorithm assignments 342 of FIG. 3). In response to a determination that the at least one compression algorithm is objectively better for the time-series profile than the target compression algorithm (e.g., by having a higher compression ratio), the data processor 652(1) can cause subsequent time-series data received from the data source to be compressed using that compression algorithm in the fashion described with respect to block 514 of FIG. 5. For example, the data processor 652(1) can dynamically assign that compression algorithm to the data source In certain embodiments, as more time-series profiles are generated and more time-series data is compressed, performance relationships between particular attributes of time-series profiles and particular attributes of algorithm signatures can be progressively discovered. For example, by analyzing algorithm performance data across a diverse set of time-series profiles and data sources, attributes of time-series profiles and attributes of algorithm signatures can be statistically isolated to determine, for example, that a particular pairing of a time-series-profile attribute with a particular algorithm-signature attribute results in worse-than-average performance, better-than-average performance, etc., as measured by one or more metrics of interest such as, for example, compression ratio. In some cases, the same analysis can be performed for some or all combinations of time-series-profile attributes with respect to some or all combinations of algorithm-signature attributes. In various embodiments, some or all of these analyses can be performed on-demand and/or on a periodic basis such as, for example, daily, weekly, etc.

In some embodiments, for each time-series-profile attribute and algorithm-signature attribute pairing for which there exists algorithm performance data, one or more relationship metrics can be determined. The one or more relationship metrics can be indicative of algorithm performance when a data source having that time-series-profile attribute in its time-series profile is compressed using a compression algorithm having that algorithm-signature attribute in its signature. The relationship metrics can include, for example, mean, median or modal values of a compression ratio, time to compress, time to decompress, a composition of the foregoing and/or other metrics, combinations of same and/or the like.

In various embodiments, machine-learning techniques can be used to train a dynamic algorithm-selection engine such as the dynamic algorithm-selection engine 114 of FIG. 1 regarding which compression algorithms are better choices for particular time-series profiles and/or particular combinations of attributes of time-series profiles. Further, in some embodiments, the functionality of the system 600 can be facilitated by a central node that stores and/or aggregates information from the data processors 652. In a particular example, in an embodiment, the ratio of destination-side data processors to source-side data processors can be one-to-many such that a destination-side data processor can centrally store performance data related to the performance of algorithms in a corresponding data store.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
    receiving, from a data source, time-series data of a time-series data stream produced by the data source;
    identifying a target compression algorithm for the time-series data, wherein the target compression algorithm is linked to the data source in memory pursuant to a dynamically-variable assignment;
    compressing the time-series data using the target compression algorithm;
    transmitting the compressed time-series data to a destination;
    accessing a sample of the time-series data stream in relation to a sample period;
    determining a time density of time-series data production by the data source over one or more intervals of the sample period, wherein the time density of time-series data production refers to a frequency with which the time-series data is produced for compression such that greater production over the one or more intervals constitutes a greater time density and less production over the one or more intervals constitutes a lower time density;
    generating a time-series profile of the sample using the time density;
    comparing attributes of the time-series profile to stored algorithm signatures comprising attributes of candidate compression algorithms, the comparing comprising identifying similarities between the time-series profile and the attributes of the candidate compression algorithms;
    selecting a compression algorithm from among a plurality of compression algorithms based at least in part on a result of the comparing; and
    causing subsequent time-series data received from the data source to be compressed using the selected compression algorithm.

2. The method of claim 1 wherein, responsive to the selected compression algorithm being different from the target compression algorithm, the causing comprises dynamically modifying the dynamically-variable assignment such that the selected compression algorithm is assigned to the data source.

3. The method of claim 1, wherein, responsive to the selected compression algorithm being the target compression algorithm, the causing comprises compressing the subsequent time-series data using the target compression algorithm.

4. The method of claim 1, comprising:
    transmitting a request for algorithm experience data to a data processor, wherein the transmitting comprises the time-series profile;
    responsive to the request, receiving algorithm performance data in relation to at least one compression algorithm;
    comparing the received algorithm performance data to algorithm performance data for the target compression algorithm;
    identifying based, at least in part, on a sampling and profiling of the time-series data that the at least one compression algorithm results in at least one of a higher compression ratio, a lower time to compress and a lower time to decompress; and
    responsive to the identifying, causing subsequent time-series data received from the data source to be compressed using the at least one compression algorithm.

5. The method of claim 1, wherein the method is performed in parallel with respect to a plurality of data sources.

6. The method of claim 1, wherein:
    the attributes of the time-series profile and the stored attributes of each of the candidate compression algorithms are each represented as a feature vector; and
    the comparing attributes comprises determining a similarity between the feature vector of the time-series profile and the feature vector of each of the candidate compression algorithms.

7. The method of claim 6, wherein:
    the attributes of the time-series profile comprise at least one of a burst frequency and a burst size.

8. An information handling system comprising a processor, wherein the processor is operable to implement a method comprising:
    receiving, from a data source, time-series data of a time-series data stream produced by the data source;
    identifying a target compression algorithm for the time-series data, wherein the target compression algorithm is linked to the data source in memory pursuant to a dynamically-variable assignment;
    compressing the time-series data using the target compression algorithm;
    transmitting the compressed time-series data to a destination;
    accessing a sample of the time-series data stream in relation to a sample period;
    determining a time density of time-series data production by the data source over one or more intervals of the sample period, wherein the time density of time-series data production refers to a frequency with which the time-series data is produced for compression such that greater production over the one or more intervals constitutes a greater time density and less production over the one or more intervals constitutes a lower time density;

generating a time-series profile of the sample using the time density;

comparing attributes of the time-series profile to stored algorithm signatures comprising attributes of candidate compression algorithms, the comparing comprising identifying similarities between the time-series profile and the attributes of the candidate compression algorithms;

selecting a compression algorithm from among a plurality of compression algorithms based at least in part on a result of the comparing; and causing subsequent time-series data received from the data source to be compressed using the selected compression algorithm.

9. The information handling system of claim 8, wherein, responsive to the selected compression algorithm being different from the target compression algorithm, the causing comprises dynamically modifying the dynamically-variable assignment such that the selected compression algorithm is assigned to the data source.

10. The information handling system of claim 8, wherein, responsive to the selected compression algorithm being the target compression algorithm, the causing comprises compressing the subsequent time-series data using the target compression algorithm.

11. The information handling system of claim 8, the method comprising:

transmitting a request for algorithm experience data to a data processor, wherein the transmitting comprises the time-series profile;

responsive to the request, receiving algorithm performance data in relation to at least one compression algorithm;

comparing the received algorithm performance data to algorithm performance data for the target compression algorithm;

identifying based, at least in part, on a sampling and profiling of the time-series data that the at least one compression algorithm results in at least one of a higher compression ratio, a lower time to compress and a lower time to decompress; and responsive to the identifying, causing subsequent time-series data received from the data source to be compressed using the at least one compression algorithm.

12. The information handling system of claim 8, wherein the method is performed in parallel with respect to a plurality of data sources.

13. The information handling system of claim 8, wherein:
the attributes of the time-series profile and the stored attributes of each of the candidate compression algorithms are each represented as a feature vector; and
the comparing attributes comprises determining a similarity between the feature vector of the time-series profile and the feature vector of each of the candidate compression algorithms.

14. The information handling system of claim 13, wherein:
the attributes of the time-series profile comprise at least one of a burst frequency and a burst size.

15. A computer-program product comprising a non-transitory computer-usable medium having computer-readable program code embodied therein, the computer-readable program code adapted to be executed to implement a method comprising:

receiving, from a data source, time-series data of a time-series data stream produced by the data source;

identifying a target compression algorithm for the time-series data, wherein the target compression algorithm is linked to the data source in memory pursuant to a dynamically-variable assignment;

compressing the time-series data using the target compression algorithm;

transmitting the compressed time-series data to a destination;

periodically optimizing, at least as measured by compression ratio, the dynamically-variable assignment in real-time as the time-series data is received, the periodically optimizing comprising:

accessing a sample of the time-series data stream in relation to a sample period;

determining a time density of time-series data production by the data source over one or more intervals of the sample period, wherein the time density of time-series data production refers to a frequency with which the time-series data is produced for compression such that greater production over the one or more intervals constitutes a greater time density and less production over the one or more intervals constitutes a lower time density;

generating a time-series profile of the sample using the time density;

comparing attributes of the time-series profile to stored algorithm signatures comprising attributes of candidate compression algorithms, the comparing comprising identifying similarities between the time-series profile and the attributes of the candidate compression algorithms;

selecting a compression algorithm from among a plurality of compression algorithms based at least in part on a result of the comparing; and causing subsequent time-series data received from the data source to be compressed using the selected compression algorithm.

16. The computer-program product of claim 15, wherein, responsive to the selected compression algorithm being different from the target compression algorithm, the causing comprises dynamically modifying the dynamically-variable assignment such that the selected compression algorithm is assigned to the data source.

17. The computer-program product of claim 15, wherein, responsive to the selected compression algorithm being the target compression algorithm, the causing comprises compressing the subsequent time-series data using the target compression algorithm.

18. The computer-program product of claim 15, the method comprising:

transmitting a request for algorithm experience data to a data processor, wherein the transmitting comprises the time-series profile;

responsive to the request, receiving algorithm performance data in relation to at least one compression algorithm;

comparing the received algorithm performance data to algorithm performance data for the target compression algorithm;

identifying based, at least in part, on a sampling and profiling of the time-series data that the at least one compression algorithm results in at least one of a higher compression ratio, a lower time to compress and a lower time to decompress; and responsive to the identifying, causing subsequent time-series data received from the data source to be compressed using the at least one compression algorithm.

19. The computer-program product of claim 15, wherein the method is performed in parallel with respect to a plurality of data sources.

20. The computer-program product of claim 15, wherein the attributes of the time-series profile and the stored attributes of each of the candidate compression algorithms are each represented as a feature vector.

* * * * *